United States Patent [11] 3,542,270

[72] Inventors Gian-Franco Schubiger
 La Tour-de Peilz;
 Roger Pilloud, Orbe, Switzerland
[21] Appl. No. 604,635
[22] Filed Dec. 27, 1966
[45] Patented Nov. 24, 1970
[73] Assignee Societe d'Assistance Technique Pour
 Produits Nestle S.A.
 Lausanne, Switzerland
 a corporation of Switzerland
[32] Priority Dec. 30, 1965
[33] Switzerland
[31] No. 18042/65

[54] PREPARATION OF A CONFECTIONERY PRODUCT OF IMPROVED TEXTURE
 11 Claims, No Drawings

[52] U.S. Cl. .................................................. 99/23,
 99/118, 99/134

[51] Int. Cl. ....................................................... A24g 1/00
[50] Field of Search ........................................... 99/23, 26,
 139, 118, 134

[56] References Cited
 UNITED STATES PATENTS
 2,645,580 7/1953 Schultz ........................ 99/23X
 2,784,096 3/1957 Ciccone ....................... 99/23
 3,098,748 7/1963 Noznick et al. ............... 99/139X OTHER REFERENCES
 Bailey, A.E. Industrial Oil and Fat Products. Interscience Publ. Inc. NY. 1951 (pages 326— 327 + 920— 923)

Primary Examiner—Lionel M. Shapiro
Assistant Examiner—D. M. Naff
Attorney—Watson, Leavenworth & Kelton ABSTRACT: Process for the preparation of a confectionery product wherein a mixture of solid and liquid fat is aerated and combined with the other ingredients of the product.

PREPARATION OF A CONFECTIONERY PRODUCT OF IMPROVED TEXTURE

The present invention is concerned with the production of a chocolate or confectionery product.

In particular, it is concerned with chocolate products which may be in the form of moulded or extruded articles such as bars or tablets, or in the form of a spread. The product obtained according to the invention has a light texture and is not sticky in the mouth.

Various processes are known for the production of chocolate articles with a cellular structure but these generally have a volume which is substantially greater than the corresponding solid articles and the pores are visible to the naked eye. The advantage of the product according to the present invention is that its apparent (visible) structure is not substantially different from that of an article of normal density whilst its density is lower. Furthermore, its texture is most agreeable to the palate.

Accordingly, the present invention provides a process for the production of chocolate products (as herein defined) containing fat which comprises the step of subjecting at least all or a part of the fat, whilst at least a part of the fat is in solid state, to a treatment which consists of incorporating air or an inert gas in said fat, in a quantity sufficient to lower the density of the chocolate product by at least 5 percent.

The term "chocolate" as used herein is intended to mean not only conventional chocolates, that is those which contain cocoa, a fat such as cocoa butter, sugar and optionally milk and flavourings, but also the so-called "white" chocolates which do not contain cocoa. The term is also intended to include products containing cocoa and a fat other than cocoa butter.

In carrying out the process according to the invention, the air or inert gas may first be incorporated in cocoa butter which is then combined with a quantity of liquid chocolate and the mixture is moulded in conventional manner.

Alternatively, a chocolate mass in which at least a part of the fat is in solid state may be treated in an aerator/cooler and the product is then moulded as before.

According to one preferred embodiment of the invention, only the fat is aerated to provide a stable foam, which may, for example, be obtained when a portion of the fat is in liquid state and the remainder is solid.

Foamed cocoa butter may be prepared in different ways. For example, one to two parts of cocoa butter at 25 to 28°C. may be placed in a tank or other recipient provided with a beater. The beater or whipper is started, and one part of finely grated solid cocoa butter is slowly added. At the end of the treatment, the density of the cocoa butter has passed 0.98 g./cc. to 0.38 g./cc.

It is also possible to prepare foamed cocoa butter by passing cocoa butter through a whipper/cooler. The apparatus known as a "Whipper chiller type M-10", manufactured by Creamery Package Mfg., New York, is particularly suitable for this purpose. During the aeration treatment the temperature of the foam is lowered to about 25°C. so that a part of the cocoa butter is in the solid phase. The quantity of gas, such as air, blown in is regulated to give the foam a density of around 0.38 g./cc. The air may, if desired, be replaced by an inert gas such as carbon dioxide or nitrous oxide.

The foamed cocoa butter may then be added to untempered liquid chocolate, the fat content of which is so adjusted that after addition of the foam the product will have a normal composition.

In general, it is convenient to add the foamed cocoa butter to the chocolate just before moulding. For example, the two constituents may be mixed together in the feed hopper of the moulding machine.

According to a further embodiment of the invention, the cocoa butter is aerated together with the other constituents making up the final product. It has been noted that the whipping and aeration of the fat contained in a chocolate product may be effected satisfactorily by passing a molten chocolate mass through a whipper/cooler such as the "whipper chiller" mentioned above. The treatment is preferably carried out at a temperature of 27 to 28°C. The density of the final product is thus reduced by about 10 percent.

In a modification of the embodiment which has just been described, a chocolate mass, for example, containing 29 to 35 percent of fat, is subjected to an overtempering during which its temperature is brought to 26 to 27°C. The chocolate is then placed in a rapid mixer or a planetary beater in which the aeration is effected. During the whipping, heat is produced by friction which causes a part of the fat to melt and which raises the temperature of the chocolate mass to 29 to 30°C. At this temperature the expansion of the fat is sufficient to lower the density of the product by about 10 percent.

After the treatment, the chocolate mass is poured directly into the feed hopper of a moulding machine, and it is moulded in the form of bars or like articles.

According to yet another embodiment of the invention, the foamed cocoa butter may be combined with a mass not containing cocoa, but, for example, milk solids and sugar, to provide a product which is designated "white chocolate". After mixing the foam with the mass, the product is moulded as before. It is also possible to prepare a similar product by passing a mixture of all the constituents through a whipper/cooler.

If desired, the cocoa butter may be replaced by one or more vegetable fats, thereby to produce a product of the chocolate spread type. The process may for example be carried out by mixing all the ingredients to provide a homogeneous paste, the principal ingredients generally being cocoa (optionally defatted), sugar, whole or skimmed milk powder, ground hazelnuts or grilled almonds, and at least one vegetable fat, for example ground nut oil which has optionally been hydrogenated. The mixture is then refined and conched, the latter operation being optional. During conching, other substances such as lecithin, vegetable fats and flavourings may be added. The plastic mass is finally aerated, for example in a "whipper chiller" apparatus. This treatment, carried out at a temperature of about 40°C. lowers the density of the mixture from 1.25 to 0.9 g./cc. The finished spread may then be packed as desired, for example in jars, cans or waxed paper cartons.

The following examples are given only for the purposes of illustrating the invention. The parts and percentages are by weight unless otherwise stated.

EXAMPLE 1

Two parts of molten cocoa butter are cooled to a temperature between 25 to 28°C. without crystallisation. The liquid butter is stirred vigorously (stirrer rotating at 300 r.p.m.) and, whilst the butter is stirred, one part of finely grated solid cocoa butter is added. After about 15 minutes stirring, a homogeneous foam of cocoa butter is obtained, white in colour and creamy in appearance. This foam is stable at temperatures of 25 to 30°C.; the density of the cocoa butter, which initially was about 0.98 g./cc. is reduced to 0.35 to 0.45 g./cc.

The cocoa butter foam may also be prepared in an aerator/cooler known as "Whipper chiller type M-10". The temperature of the cocoa butter, which is 33°C. on entry, is about 25°C. when it leaves the machine in the form of a foam. The air pressure is set at 1.3 kg./cm.$^2$ and the air supply from the pump corresponds to an approximate hourly yield of 180 litres of foam.

The cocoa butter foam is added to an untempered milk chocolate mass which is at 28°C., in a quantity corresponding to 5 percent by weight of the mass. The mixture is carried out in the feed hopper of a moulding machine, the stirrer being adequate to provide a homogeneous mixture. Finally, the chocolate is moulded as bars.

The moulded articles thus produced are pale in colour and have a density between 1.10 and 1.15 g./cc. The cellular structure is not visible to the naked eye; the taste of the product is similar to normal chocolate. It is, however, lighter, nonsticky and melts more rapidly in the mouth.

EXAMPLE 2

Two hundred kg. of a molten chocolate mass, comprising 22 percent of milk solids and containing 32 percent of fat are maintained at a temperature of 33—35°C. This mass is passed into an aerator/cooler known as "whipper chiller type M-10" (Creamy Package Mfg. Co.). The air pressure is set at 1.2 kg./cm.² and the feed pump is adjusted to give an hourly output of 120 to 150 litres of foam. During the treatment, the product is cooled so that it leaves the apparatus at a temperature between 27 to 30°C.

The aerated chocolate is then moulded directly in the form of bars. The moulded article has substantially the same properties as those described in the preceding example.

EXAMPLE 3

Fifty kg. of a molten mass of chocolate containing 34 percent of fat, at a temperature of 34°C., are subjected to an overtempering treatment at 26 to 27°C. The overtempered mass is then placed in a planetary whipper. The mechanical forces of friction liberate heat which causes a portion of the cocoa butter present in the chocolate to melt. When a temperature of 29 to 30°C. is reached, which is after about 3 minutes beating, the density of the product, which originally was 1.25 g./cc., is lowered to 1.13 g./cc.

The aerator may for example be installed above the feed hopper of a moulding machine, so that the moulding may be carried out in continuous manner.

Finally, the chocolate is moulded and cooled. The finished product has the same properties as that described in example 1.

We claim:
1. Process for the production of a confectionery product containing fat and other confectionery ingredients which comprises aerating a mixture consisting essentially of liquid and solid vegetable fat with air or inert gas to provide a stable foam and combining said foam with other confectionery ingredients.

2. Process according to claim 1, in which the foam is prepared by whipping and cooling the fat.

3. Process according to claim 2, in which the fat is cocoa butter.

4. Process according to claim 1, in which the fat is cocoa butter and in which the foam is combined with a liquid chocolate mass and the mixture is moulded.

5. Process according to claim 4, in which the liquid chocolate is an untempered chocolate.

6. Process according to claim 1, in which the fat is cocoa butter and in which the foam is combined with a confectionery mass consisting essentially of sugar and milk solids and the mixture is moulded.

7. Process for the production of a confectionery product which comprises overtempering a mixture of liquid cocoa butter, sugar and at least one of cocoa powder and milk solids at a temperature of about 27—28°C. to solidify at least a portion of the cocoa butter, said mixture containing at least about 28 percent cocoa butter, and whipping and cooling the mixture.

8. Process for the production of a confectionery product containing fat and other confectionery ingredients which comprises aerating at a temperature of 25 to 28°C., a mixture consisting essentially of one to two parts of liquid cocoa butter with one part of finely grated solid cocoa butter with air or inert gas, whipping the aerated mixture to provide a stable foam, and combining said foam with other confectionery ingredients.

9. Process according to claim 8, in which the other confectionery ingredients with which the stable foam is mixed comprise untempered liquid chocolate.

10. Process for the production of a confectionery product containing fat and other confectionery ingredients which comprises aerating at a temperature of 25 to 28°C., a mixture consisting essentially of one to two parts of liquid cocoa butter with one part of finely grated solid cocoa butter with air or inert gas, whipping the aerated mixture to provide a stable foam, combining said foam with a confectionery mass consisting essentially of sugar and milk solids, and moulding the stable foam-confectionery mass mixture.

11. A stable cocoa butter foam prepared from a mixture consisting essentially of liquid cocoa butter and solid cocoa butter which has been aerated with air or inert gas.